United States Patent
Yeh et al.

(10) Patent No.: US 8,619,714 B2
(45) Date of Patent: Dec. 31, 2013

(54) METHOD OF ALLOCATING RESOURCE AND METHOD OF FORMING RANGING CHANNEL

(75) Inventors: Choong Il Yeh, Daejeon (KR); Byung-Jae Kwak, Seoul (KR); Dong Seung Kwon, Daejeon (KR); Jee Hwan Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 315 days.

(21) Appl. No.: 12/991,204

(22) PCT Filed: May 6, 2009

(86) PCT No.: PCT/KR2009/002378
§ 371 (c)(1),
(2), (4) Date: Nov. 5, 2010

(87) PCT Pub. No.: WO2009/136732
PCT Pub. Date: Nov. 12, 2009

(65) Prior Publication Data
US 2011/0058533 A1    Mar. 10, 2011

(30) Foreign Application Priority Data

| | | |
|---|---|---|
| May 6, 2008 | (KR) | 10-2008-0041666 |
| Sep. 5, 2008 | (KR) | 10-2008-0087913 |
| Apr. 28, 2009 | (KR) | 10-2009-0037197 |

(51) Int. Cl.
*H04W 4/00* (2009.01)

(52) U.S. Cl.
USPC ........... 370/331; 370/330; 370/328; 370/329; 370/324; 370/208; 370/253; 370/260; 370/280

(58) Field of Classification Search
USPC ......... 370/331, 208, 253, 260, 280, 324, 330, 370/328, 329
See application file for complete search history.

(56) References Cited

U.S. PATENT DOCUMENTS

| | | | | |
|---|---|---|---|---|
| 5,521,907 A | * | 5/1996 | Ennis et al. | 370/253 |
| 5,982,758 A | * | 11/1999 | Hamdy | 370/331 |
| 2004/0252630 A1 | * | 12/2004 | Alapuranen | 370/208 |
| 2005/0135230 A1 | * | 6/2005 | Yu et al. | 370/210 |
| 2005/0286465 A1 | * | 12/2005 | Zhuang | 370/329 |

(Continued)

FOREIGN PATENT DOCUMENTS

| | | |
|---|---|---|
| EP | 1 571 770 | 3/2005 |
| WO | WO 2006/062285 | 6/2006 |

(Continued)

OTHER PUBLICATIONS

Xiaoyu Fu et al., "A New Ranging Method for OFDMA Systems", IEEE Transactions on Wireless Communications, vol. 6, No. 2, Feb. 2007, pp. 659-669.
International Search Report mailed Nov. 24, 2010 in corresponding International Application No. PCT/KR2009/002378.

*Primary Examiner* — Wing F Chan
*Assistant Examiner* — Padma Mundur
(74) *Attorney, Agent, or Firm* — Staas & Halsey LLP

(57) ABSTRACT

An access point allocates a resource for ranging to an access terminal included therein, and receives a ranging channel that includes an identifier of the access terminal and a plurality of pilots. The AP checks the access terminal by using the received identifier, and measures a round trip delay of the access terminal based on the received pilots.

10 Claims, 4 Drawing Sheets

(56) References Cited

U.S. PATENT DOCUMENTS

| | | | |
|---|---|---|---|
| 2006/0018393 A1* | 1/2006 | Gore et al. | 375/260 |
| 2007/0058524 A1* | 3/2007 | Modlin et al. | 370/208 |
| 2007/0140165 A1 | 6/2007 | Kim et al. | |
| 2008/0049674 A1* | 2/2008 | Cha et al. | 370/331 |

FOREIGN PATENT DOCUMENTS

| | | | |
|---|---|---|---|
| WO | WO 2007/050923 | | 5/2007 |
| WO | WO 2008/024577 | | 2/2008 |
| WO | WO2008130126 | * | 10/2008 |

* cited by examiner

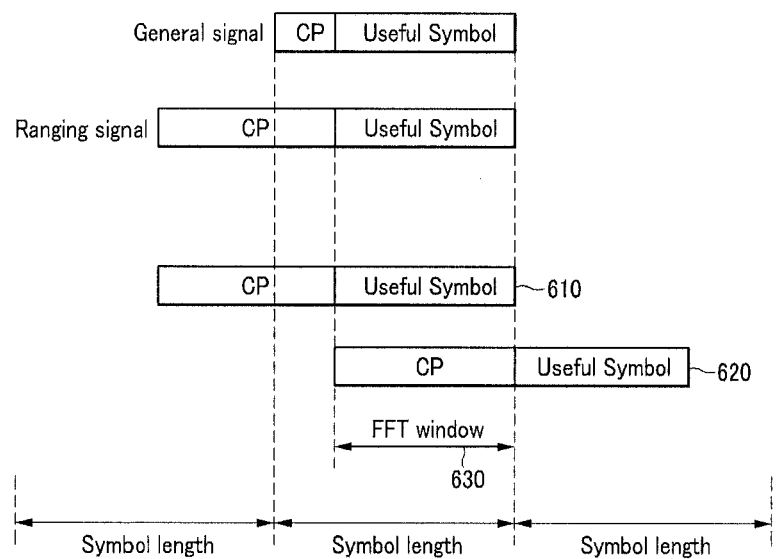

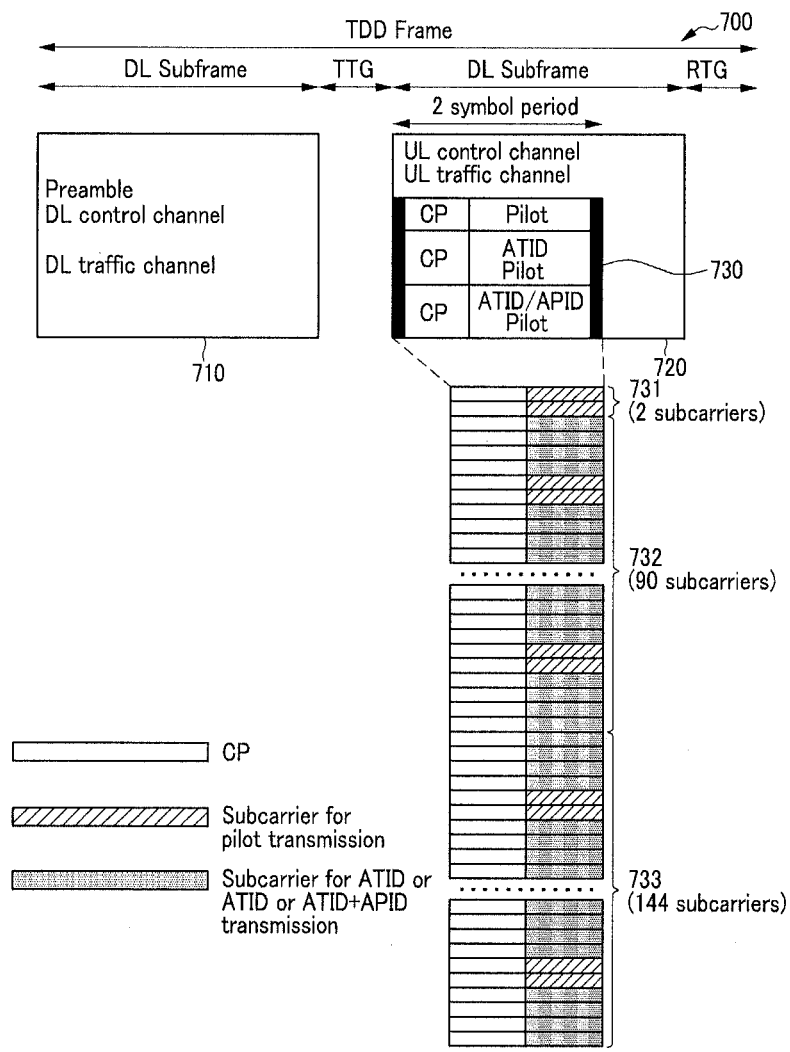

METHOD OF ALLOCATING RESOURCE AND METHOD OF FORMING RANGING CHANNEL

CROSS REFERENCE TO RELATED APPLICATIONS

This application claims the benefit under 35 U.S.C. Section 371, of PCT International Application No. PCT/KR2009/002378, filed May 6, 2009, which claimed priority to Korean Application Nos. 10-2008-0041666 filed May 6, 2008, 10-2008-0087913 filed Sep. 5, 2008 and 10-2009-0037197 filed Apr. 28, 2009, the disclosures of which are hereby incorporated by reference.

TECHNICAL FIELD

The present invention relates to a method for an access point to check an access terminal included therein and to measure a round trip delay of the corresponding access terminal.

BACKGROUND ART

In a communication system, each of access terminals included in an access point control transmission time of a signal to an access point (AP) in consideration of a round trip delay that is generated according to a distance between each access terminal and the AP so that signals transmitted from the access terminals included in the corresponding AP can be simultaneously received at the AP.

As described, a series of process in which an access terminal perceives a round trip delay of the access terminal and controls transmission time is referred to as uplink synchronization or ranging, and an uplink control channel for supporting this process is referred to as a ranging channel.

The ranging is classified as initial ranging performed at initial network entry, handover ranging for uplink synchronization with a target AP during handover, and periodic ranging that continuously maintains uplink synchronization after initial ranging, and an initial ranging channel, a handover ranging channel, and a periodic ranging channel are uplink channels that respectively support the respective ranging.

FIG. 1 shows a general ranging method.

An access terminal acquires downlink synchronization and receives a parameter UL_MAP (UIUC=12) for ranging that is transmitted from an access point (AP).

Each access terminal selects one of channels allocated for ranging at random, selects one of frequency domain ranging codes designed for measuring a round trip delay by using the selected channel, and transmits the selected frequency domain ranging code to the AP. In this case, a ranging channel is defined in an uplink, and the access terminal can perceive locations and quantity of the ranging channels by using the parameter received from the AP. If a plurality of access terminals select the same channel, the ranging channel received from the AP includes ranging information of the plurality of access terminals. Even if the plurality of access terminals select the same channel for transmission, the AP can measure a round trip delay of each access terminal if each access terminal selects a different code.

After measuring the round trip delay, the AP broadcasts which code is detected from which ranging channel, a round trip delay value related thereto, and a ranging status (RNG_RSP). If the ranging status determination is continued, the access terminal repeats the above processes until the ranging status is deemed "success".

If the ranging status received from the AP is "success", the ranging is terminated and the access terminal transmits an RNG-REQ message that includes a media access control (MAC) address of the access terminal, a MAC version, a requested downlink burst profile, and a hash message authentication code (HMAC)/cipher-based message authentication code (CMAC) Tuple to the AP.

In a general communication system, uplink synchronization of an access terminal included in an AP is acquired through the above-described process. However, such a ranging process requires several information exchanges between an access terminal and an AP so that the process is complicated, thereby causing a decrease of frequency use efficiency.

DISCLOSURE

Technical Problem

The present invention has been made in an effort to provide a method for an access point to check an access terminal included therein, and to measure a round trip delay of the corresponding access terminal.

Technical Solution

According to an exemplary embodiment of the present invention, a resource allocation method is provided.

A method for allocating a resource for a ranging channel from an access point (AP) to an access terminal includes: allocating a resource for ranging to the access terminal; receiving a ranging channel from an access terminal included in the AP, the ranging channel including an identifier of the access terminal and a plurality of pilots; checking the access terminal based on the identifier of the access terminal; and estimating a channel and measuring a round trip delay of the access terminal based on the pilots.

According to another exemplary embodiment of the present invention, a ranging channel forming method is provided.

A method for an access terminal to form a ranging channel includes: performing channel coding for ranging channel information; mapping channel-coded ranging channel information and a pilot to a subcarrier and modulating the mapped subcarrier; and generating a ranging channel by performing inverse fast Fourier transform (IFFT) on the modulated signal. Here, the ranging channel information includes an identifier of the access terminal.

A method for an access terminal to form a periodic ranging channel does not include an identifier of the access terminal and identifier information of the serving AP, but does include at least one pair of pilots for round trip delay measurement.

Advantageous Effects

According to the exemplary embodiments of the present invention, spectrum use efficiency can be improved by reducing radio resources required for supporting a complicated process and radio resources that are directly used for an initial ranging channel, a handover ranging channel, and a periodic ranging channel. In addition, network entry and handover can be promptly performed by simplifying the process.

DESCRIPTION OF DRAWINGS

FIG. 6 shows a fast Fourier transform window set in an access point according to the exemplary embodiment of the present invention.

FIG. 7 shows a frame configuration according to an exemplary embodiment of the present invention.

MODE FOR INVENTION

Figure 1:
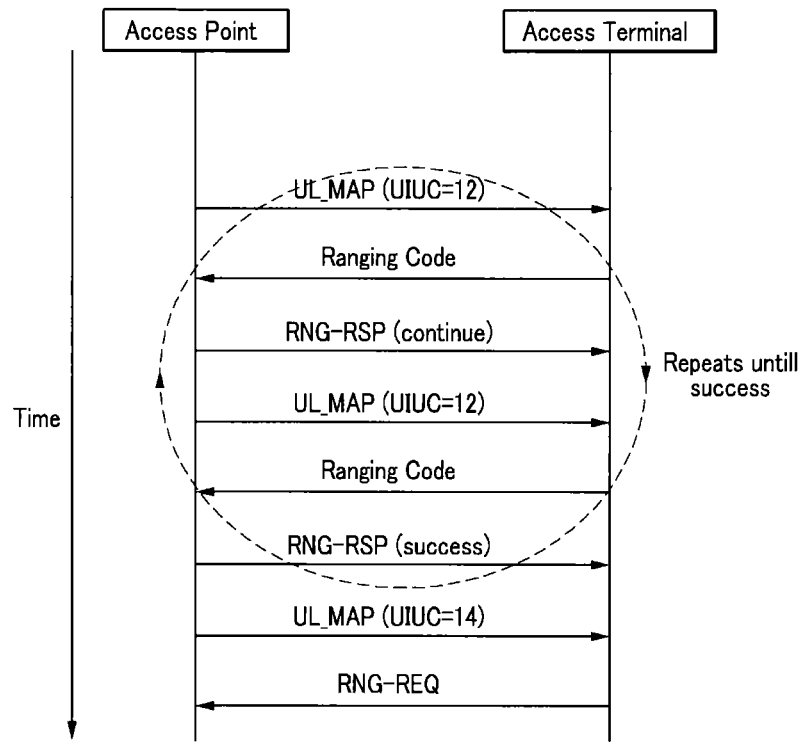
FIG. 1 shows a general ranging method.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In the specification, an access terminal (AT) may indicate a mobile access terminal (MT), a subscriber station (SS), a portable subscriber station (PSS), user equipment (UE), and a mobile station (MS), and may include the entire or partial functions of the access terminal, mobile access terminal, subscriber station, portable subscriber station, user equipment, and access terminal.

In the specification, an access point (AP) may indicate a base station (BS), a radio access station (RAS), a node B (Node B), a base transceiver station (BTS), and a mobile multihop relay base station (MMR-BS), and may include the entire or partial functions of the access point, radio access station, node B, base transceiver station, and mobile multihop relay base station.

Hereinafter, a resource allocation method and a ranging channel forming method according to an exemplary embodiment of the present invention will be described in further detail with reference to the drawings.

Figure 2:
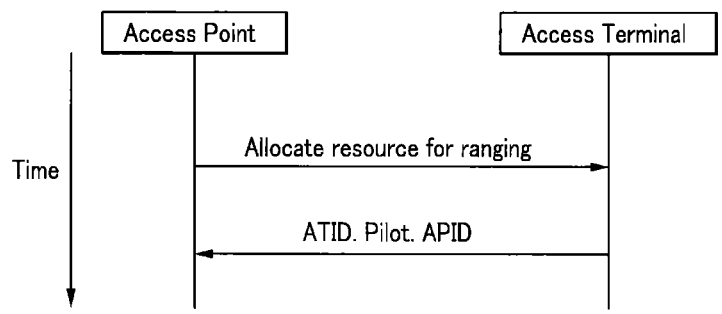
FIG. 2 shows a resource allocation method for a ranging channel according to an exemplary embodiment of the present invention.

FIG. 2 shows a resource allocation method for a ranging channel according to an exemplary embodiment of the present invention.

Referring to FIG. 2, an access point (AP) allocates a resource to an access terminal included in the AP for ranging. The AP allocates an uplink ranging channel for access terminals included therein for transmission of an access terminal identifier (ATID) and a plurality of pilots of the corresponding access terminal. In this case, the ranging channel is allocated to be used by all the access terminals included in the AP rather than being allocated to a specific access terminal.

At initial network entry, the access terminal transmits an ATID of the access terminal by using the ranging channel in order to notify the access terminal to the AP. In addition, the access terminal transmits a pilot having a specific pattern for measuring a round trip delay of the access terminal, together with the ATID.

The AP checks the access terminal by using a demodulated ATID, coherent detects by using the pilot, and measures a round trip delay of the corresponding access terminal.

During handover, the access terminal transmits not only the ATID of the access terminal but also an access point identifier (APID) of a serving AP and a pilot having a specific pattern to a target AP. Accordingly, the target AP can request a profile of an access terminal that attempts a handover from the serving AP, and in this case, the target AP can measure a round trip delay of the corresponding access terminal. In addition, when a plurality of access terminals simultaneously use the ranging channel according to the exemplary embodiment of the present invention, collision may occur, and in this case, the access terminal may reattempt ranging channel transmission according to a predetermined algorithm.

Figure 3:
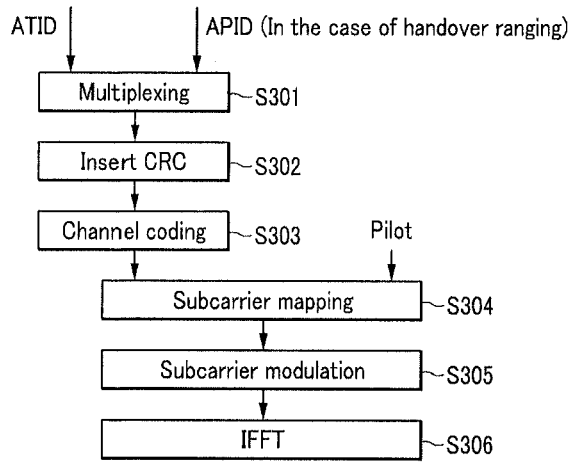
FIG. 3 shows a method for configuring a ranging channel in an access terminal according to the exemplary embodiment of the present invention.

FIG. 3 shows a method for forming a ranging channel in the access terminal according to the exemplary embodiment of the present invention.

Referring to FIG. 3, the access terminal multiplexes ranging channel information ("ATID for initial ranging" or "ATID and APID for handover ranging") (S301), inserts a cyclic redundancy check (CRC) for data error detection in the ranging channel information (ATID or ATID+APID) (S302), and performs channel coding (S303).

The access terminal maps the channel-coded ranging channel information, the CRC, and the pilot to a subcarrier of the ranging channel (S304), modulates the subcarrier (S305), and performs inverse fast Fourier transform (IFFT) (S306) and transmits a result of the IFFT to the AP.

The ranging channel is formed of a plurality of physical resource units (PRUs), and the number of allocated ranging channels can be flexibly changed in order to reduce packet collision probability that occurs when the plurality of access terminals included in the AP simultaneously transmit ranging channels.

If it is assumed that the PRU is formed of $P_{sc}$ neighboring subcarriers and $N_{sym}$ neighboring symbols, and the number of PRUs is determined in accordance with a pilot overhead and the amount of ranging channel information.

For example, if it is assumed that the ATID, the APID, and the CRC are respectively set to 16 bits, 24 bits, and 16 bits, initial ranging channel information becomes 16 bits which is bits for the ATID and the handover ranging channel information becomes 16 bits (bits for ATID) and 24 bits (bits for APID) for a total of 40 bits.

If the binary phase shift keying (BPSK) and ½ code rate are used for the coding scheme, the initial ranging requires 2(16+16)=64 subcarriers, including CRC, and the handover ranging requires 2(40+16)=112 subcarriers.

In addition, if it is assumed that the PRU is formed of 18 neighboring subcarriers and 1 symbol ($P_{sc}$=18, $N_{sym}$=1) and each PDU requires 4 pilots for round trip delay measurement, 64/18−4=4.57, that is, 5 PRUs are required for allocation of one initial ranging channel and 112/18−4=8, that is, 8 PRUs are required for allocation of one handover ranging channel.

For measuring a round trip delay of an access terminal, a pair of pilots are required. A subcarrier for transmitting a pair of pilots for the round trip delay denotes the (k-th, (k+1)-th) subcarriers or the (k-th, (k+n)-th) subcarriers. When a pair of pilots ($p_k$, $p_{k+n}$) are given, the AP can measure a round trip delay of the corresponding access terminal by using Equation 1.

$$\text{Round Trip Delay[\# of samples]} = \frac{1}{n} \text{round}\left[\frac{FFTSize \times \text{Phase}(p_k p_{k+n}^*)}{2\pi}\right] \quad \text{[Equation 1]}$$

In Equation 1, $p_k$ is a fast Fourier transform (FFT) output value of an AP for a subcarrier allocated to a pilot, k denotes a subcarrier identifier, and n denotes a value of a subcarrier difference between a pair of pilots. Here, n is a design parameter that can be changed according to circumstances, but it should be sufficiently small to maintain coherency between subcarriers.

The round trip delay can be realized by averaging round trip delays of the entire pilot pairs (10 pairs of pilots for initial ranging and 16 pairs of pilots for handover), or by using a pair of pilots having the highest received signal strength (RSS).

Figure 4:
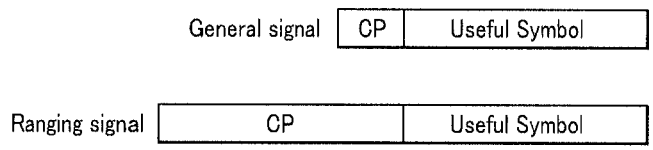
FIG. 4 shows a ranging signal in a time domain.
Figure 5:
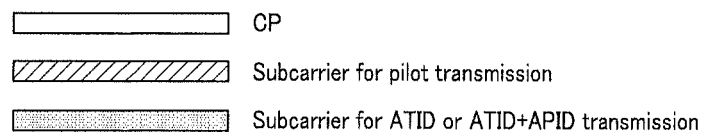
FIG. 5 shows a ranging signal in a frequency domain.
Figure 5:
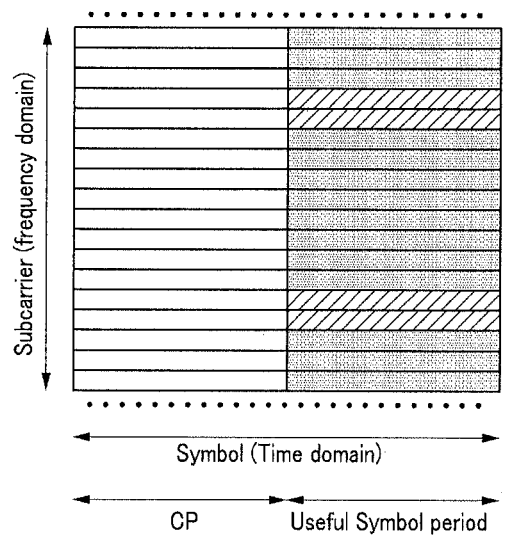

FIG. 4 shows a ranging signal in a time domain, and FIG. 5 shows a ranging signal in a frequency domain.

Referring to FIG. 4 and FIG. 5, the length of a CP of a ranging symbol is greater than the length of a CP of a data symbol. In the present exemplary embodiment, as an example, the CP length of the ranging symbol is set to be the same as the length of a useful symbol period. This is because, since an access terminal in the state of not acquiring uplink synchronization transmits a ranging signal to enable an AP to measure a round trip delay of the access terminal, a cyclic prefix (CP) of the ranging signal should be sufficiently large in consideration of the round trip delay and the maximum channel delay of the corresponding access terminal.

Considering the length of the CP, transmission of one PRU (14 subcarriers for ranging channel information (ATID or ATID+APID) transmission, 4 subcarriers for pilot transmission) needs 18 neighboring subcarriers and 2 neighboring symbols as radio resources.

FIG. 5 shows the case in which a subcarrier difference between a pair of pilots for measuring the round trip delay of the access terminal is 1 (n=1).

FIG. 6 shows an FFT window that is set in the AP according to the exemplary embodiment of the present invention.

Referring to FIG. 6, a general signal has a length of a sum of a CP length and a useful symbol period length, and a ranging signal has a CP length that is that same as a useful symbol period length. Thus, the CP length of the ranging signal is longer that that of the general signal.

In FIG. 6, reference numeral 610 denotes a ranging signal received from an access terminal that is the closest to the AP, and reference numeral 620 denotes a ranging signal received from an access terminal at a cell boundary.

The AP sets an FFT window 630 to be the same as a useful symbol period of the ranging signal received from the access terminal at the cell boundary irrespective of location of the access terminal in the cell (630).

FIG. 7 shows a frame structure according to the exemplary embodiment of the present invention.

FIG. 7 shows configuration of an initial ranging channel, a handover ranging channel, and a periodic ranging channel in the frame according to the exemplary embodiment of the present invention.

The present invention is applicable to any of frequency division duplex (FDD) or time division duplex (TDD), and the present specification is exemplarily applied to the TDD.

A frame 700 includes a downlink (DL) subframe 710 and an uplink (UL) subframe 720, and a region 730 in the UL subframe 720 is allocated for ranging channel configuration.

A channel transmitted from the DL subframe 710 includes a preamble, a DL control channel, and a DL traffic channel, and a channel transmitted from the UL subframe 720 includes initial, handover, and periodic ranging channels, another UL control channel, and another UL traffic channel.

The region 730 allocated for ranging channel configuration is divided into a periodic ranging channel region 731, an initial ranging channel region 732, and a handover ranging channel region 733.

For example, if 61 bits for ATID, 24 bits for APID, 16 bits for CRC, a BPSK coding scheme, and a ½ encoding rate are used, 5 PRUs and 8 PRUs are respectively consumed for the initial ranging and the handover ranging, and therefore 90 subcarriers are used for the initial ranging channel configuration, 144 subcarriers are used for the handover ranging channel configuration, and 2 subcarriers are used for the periodic ranging channel configuration. Since the initial ranging and handover ranging channels respectively require a large CP, 2 symbols are used for ranging channel transmission in FIG. 7. The periodic ranging channel can improve spectrum use efficiency by using a CP that is shorter than a CP used for initial or handover ranging. However, the bandwidth for the periodic ranging channel configuration is substantially very small so that there is no need for complicating control of the two subcarriers by setting the lengths of CPs of the two subcarriers to be different from each other. Therefore, it is assumed in FIG. 7 that the CP size of the periodic ranging is the same as the CP size used for the initial ranging or the handover ranging.

In the exemplary embodiment of the present invention, the handover ranging is applicable to network re-entry of an access terminal.

In addition, although the CP length is equal to the useful symbol period in the above description, the CP length can be flexibly changed according to a cell radius. If the cell radius is large, round trip delay is increased and accordingly a large CP is used. If the cell radius is small, a small CP can be used.

Therefore, a macro-cell having a large cell radius may be set to use a large CP, and a micro-cell having a small cell radius may be set to use a small CP. For ease of design, only one large CP may be set to be used regardless of the cell size.

If a relay station having a decoding function for coverage expansion and system performance improvement is employed in a general network, an access point connected to a backhaul and a relay station not connected to the backhaul may share resources by dividing a frame.

In this case, the concept of the present invention may be applied to only a resource (a portion allocated to transmission/receiving of the relay station in the frame) used by the relay station not connected to the backhaul. That is, the access point connected to the backhaul may operate a general ranging channel and the relay station not connected to the backhaul may operate the ranging channel of the exemplary embodiment of the present invention.

In addition, in such as a femto cell, a sum of the maximum channel delay and a round trip delay of a low power environment having a small coverage, such as a femto cell environment, is less than the maximum channel delay of a macro-cell environment. In this case, after performing uplink synchronization in the macro-cell, if the same CP as of a general data channel where only the maximum channel delay is accepted without considering a round trip delay is applied to the femto cell, no further synchronization is required in the femto cell.

Therefore, in the femto call, a ranging channel for the uplink synchronization does not need to be defined but an access terminal needs a channel for transmitting an ATID (or ATID+APID of an AP of a serving femto cell) to notify the access terminal to an AP. That is, for ranging in the femto cell, pilots having specific patterns do not need to be transmitted by using neighboring subcarriers for supporting round trip delay measurement of the AP. However, a pilot for the AP to perform "coherent detection" on transmission information needs to be transmitted.

Hereinafter, a periodic ranging channel according to an exemplary embodiment of the present invention will be described.

After an access terminal acquires uplink synchronization by using an initial ranging channel, the access terminal needs a periodic ranging channel for continuously maintaining the uplink synchronization.

The access terminal does not need to transmit specific information by using the periodic ranging channel, but needs to transmit a pilot having a specific pattern for round trip delay measurement of the AP. In addition, the periodic ranging channel is utilized not for an uplink synchronization acquisition process but for a process for continuously maintaining the uplink synchronization so that the CP length does not need to be as large as the CP in the initial ranging channel.

According to the exemplary embodiment of the present invention, a ranging process can be simplified, thereby reducing realization complexity and achieving fast realization. In further detail, neither the access terminal nor the AP need to generate and manage codes related to initial ranging and handover ranging, and particularly, the AP does not need to check a code correlation. Accordingly, realization complexity can be reduced.

According to the exemplary embodiment of the present invention, the spectrum use efficiency can be improved by reducing a bandwidth for complicated process support and a bandwidth that is directly consumed for the initial ranging, the handover ranging, and the periodic ranging.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for allocating a resource for a ranging channel from an access point to an access terminal, comprising:
    allocating a resource for ranging to the access terminal;
    receiving the ranging channel from an access terminal included in the access point, the ranging channel including an identifier of the access terminal and a plurality of pilots;
    checking the access terminal based on the identifier of the access terminal; and
    measuring a round trip delay of the access terminal based on the pilots,
    wherein the measuring of the round trip delay of the access terminal is performed based on at least one pair of pilots among the plurality of pilots, and
    wherein the round trip delay is determined by a phase difference of subcarriers to which at least one pair of pilots is mapped and an FFT window size.

2. The method of claim 1, wherein, when the access terminal performs a handover to the access point, the ranging channel further includes an identifier of a previous access point of the access terminal.

3. The method of claim 1, wherein the measuring of the round trip delay includes obtaining an average value of round trip delay values of the entire pairs of pilots of the plurality of pilots.

4. The method of claim 1, wherein the round trip delay is determined based on a pair of pilots having the highest received signal strength among the plurality of pilots.

5. A method for allocating a resource for a ranging channel from an access point to an access terminal, comprising:
    allocating a resource for ranging to the access terminal;
    receiving the ranging channel from an access terminal included in the access point, the ranging channel including an identifier of the access terminal and a plurality of pilots,
    checking the access terminal based on the identifier of the access terminal; and
    measuring a round trip delay of the access terminal based on the pilots,
    wherein the measuring of the round trip delay of the access terminal is performed based on at least one pair of pilots among the plurality of pilots, and
    wherein the round trip delay corresponds to a value obtained by dividing a phase of the product of the pair of pilots by the product of a subcarrier difference between the pair of pilots and $2\pi$.

6. The method of claim 1, wherein the ranging channel comprises:
    a useful symbol period including an identifier of the access terminal and the pilot; and
    a cyclic prefix (CP) of which the size is greater than the sum of a channel delay and a round trip delay.

7. A method for an access terminal to form a ranging channel, comprising:
    performing channel coding for ranging channel information;
    mapping channel-coded ranging channel information and a pilot to a subcarrier and modulating the mapped subcarrier; and
    generating a ranging channel by performing inverse fast Fourier transform (IFFT) on the modulated signal,
    wherein the ranging channel information includes an identifier of the access terminal, and
    wherein a round trip delay corresponds to a value obtained by dividing a phase of the product of one pair of pilots by the product of a subcarrier difference between the pair of pilots and $2\pi$.

8. The method of claim 7, wherein the ranging channel information further includes an identifier of a serving access point (AP) of the access terminal.

9. The method of claim 8, wherein the ranging channel is divided into:
    an initial ranging region including the access terminal identifier and the pilot;
    a periodic ranging region including only the pilot; and
    a handover ranging region including the access terminal identifier, the pilot, and an identifier of the serving AP.

10. The method of claim 1, wherein a channel estimation for demodulation of the ranging channel is performed based on the pilots.

* * * * *